United States Patent [19]
Linzalone

[11] Patent Number: 6,068,339
[45] Date of Patent: May 30, 2000

[54] VIBRATING VEHICLE SEAT SYNCHRONIZED WITH ENGINE

[76] Inventor: Salvatore Linzalone, 135 E. 50th St., Apt. 2L, New York, N.Y. 10022

[21] Appl. No.: 08/936,827

[22] Filed: Sep. 25, 1997

[51] Int. Cl.[7] .................................................. A47C 15/00
[52] U.S. Cl. ............................................... 297/463.1
[58] Field of Search ............................. 297/217.1, 217.3, 297/217.7, 284.6, 260.2, 463.1, 463.2; 601/57, 58, 59, 60, 49, 50, 51, 52, 53, 54; 180/53.1, 313; 280/727

[56] References Cited

U.S. PATENT DOCUMENTS

| | | |
|---|---|---|
| 3,037,499 | 6/1962 | Cummins . |
| 4,203,098 | 5/1980 | Muncheryan . |
| 4,465,158 | 8/1984 | Yamazaki et al. . |
| 4,655,505 | 4/1987 | Kashiwamura et al. . |
| 4,748,972 | 6/1988 | Hasegawa . |
| 4,920,583 | 5/1990 | Hough et al. . |
| 5,020,517 | 6/1991 | Foster, Jr. et al. . |
| 5,022,384 | 6/1991 | Freels et al. . |
| 5,188,096 | 2/1993 | Yoo . |
| 5,265,590 | 11/1993 | Takagi . |
| 5,320,409 | 6/1994 | Katoh et al. . |
| 5,348,370 | 9/1994 | Fukuoka . |
| 5,634,685 | 6/1997 | Herring . |

*Primary Examiner*—Milton Nelson, Jr.

[57] ABSTRACT

A vibrating vehicle seat is provided, wherein a vibrating motor is adapted to be installed under the seat of a vehicle. When installed in a vehicle seat, the vibrating motor receives its power from the battery of the vehicle and the frequency of the vibration is automatically adjusted in proportion to the speed of rotation of the vehicle's engine. There may be a separate manual on/off switch that can additionally control the force of the vibration. A controller box may also be provided with a multiple setting switch to select inputs from 1 to 4 stroke engines, 1 to 8 cylinder engines and 2 to 4 cycle engines. In addition to, or in substitution for, the vibrating motor, passenger stimulation may also be supplied by a rotational massaging ball that will have a moving or a rubbing sensation through the seat in any desired location.

17 Claims, 4 Drawing Sheets

6,068,339

VIBRATING VEHICLE SEAT SYNCHRONIZED WITH ENGINE

FIELD OF THE INVENTION

This invention relates to the provision of stimulation, comfort and humorous novelty to the occupants of vehicle seats, and in particular motorcycle seats.

BACKGROUND OF THE INVENTION

Many products are currently being sold to increase the comfort of vehicle passengers. However, most of these products are static in nature, such as cushions installed over the seats of the vehicle. While not widely available in the market, some prior art patents disclose vibrating seats; however, this prior art is limited to vibration at speeds and intensities that are constant or must be controlled manually. The current invention adds a dimension of stimulation, comfort and humorous novelty not previously known in vehicle seats by providing dynamic vibration through the seat in proportion to the speed of rotation of the vehicle's engine. The preferred embodiment is a motorcycle passenger seat, however, the concept can be applied to the back rest of the motorcycle, to the driver's seat or to any seat in any vehicle that contains a battery and an internal combustion engine.

SUMMARY OF THE INVENTION

The present invention comprises a vibrating motor mounted within a cushioned motorcycle seat. The vibrator is mounted in the desired hollowed-out portion of the cushioned seat. In the preferred embodiment, the exterior of the seat does not reveal that a vibrator is inside. But this invention can also be used on the outside top of the seat by inserting the vibrator in a pouch and strapping or "Velcroing" the pouch to the top of the seat.

In the preferred embodiment, the vibrator receives its power from the vehicle's own 12 volt battery, thereby eliminating a separate power supply. The invention can also be applied to other than motorcycle seats, such as any motor vehicle seat or back rest, and powered by a separate battery provided for the vibrator motor in addition to the vehicle's own ignition battery. Its object to provide a pulsating vibration which begins to increase the with the acceleration of the vehicle. A multi-speed switch is provided to control the strength of the vibrator and also to shut it off.

Other objects and advantages of the invention will be apparent to those skilled in the art, from reading of the following brief description of the drawings, the detailed description of the invention, and the appended claims.

DETAILED DESCRIPTION OF THE INVENTION

This invention provides a vibrating vehicle seat that synchronizes the frequency of vibration with the rotational speed of the vehicle's engine. The invention operates through the provision of 1) a means for providing vibration to a vehicle seat, 2) a means for providing power to the vibrating means and 3) a means for synchronizing the frequency of vibration with the rotational speed of the vehicle's engine.

In the preferred embodiment the vibrating means is a small 12 volt motor driving a rotating shaft attached to an off-center weight. These motors are commonly available on the market, such as those used in vibrating toys. A wide range of motors can be used, but two examples of appropriate motors are Mabuchi Motor America Corp. Model No. RC-280SA-20120 (round body) and Model No. SH-030SA-08240 (square body). Additionally, the off-center weight can be replaced with a massage ball and/or a bent shaft to produce a rubbing sensation instead of or in addition to vibration. Other vibrating means that can be used are solenoid switch vibrators, mechanical or magnetic hammer vibrators, or any other commonly available vibrator.

Figure 1:
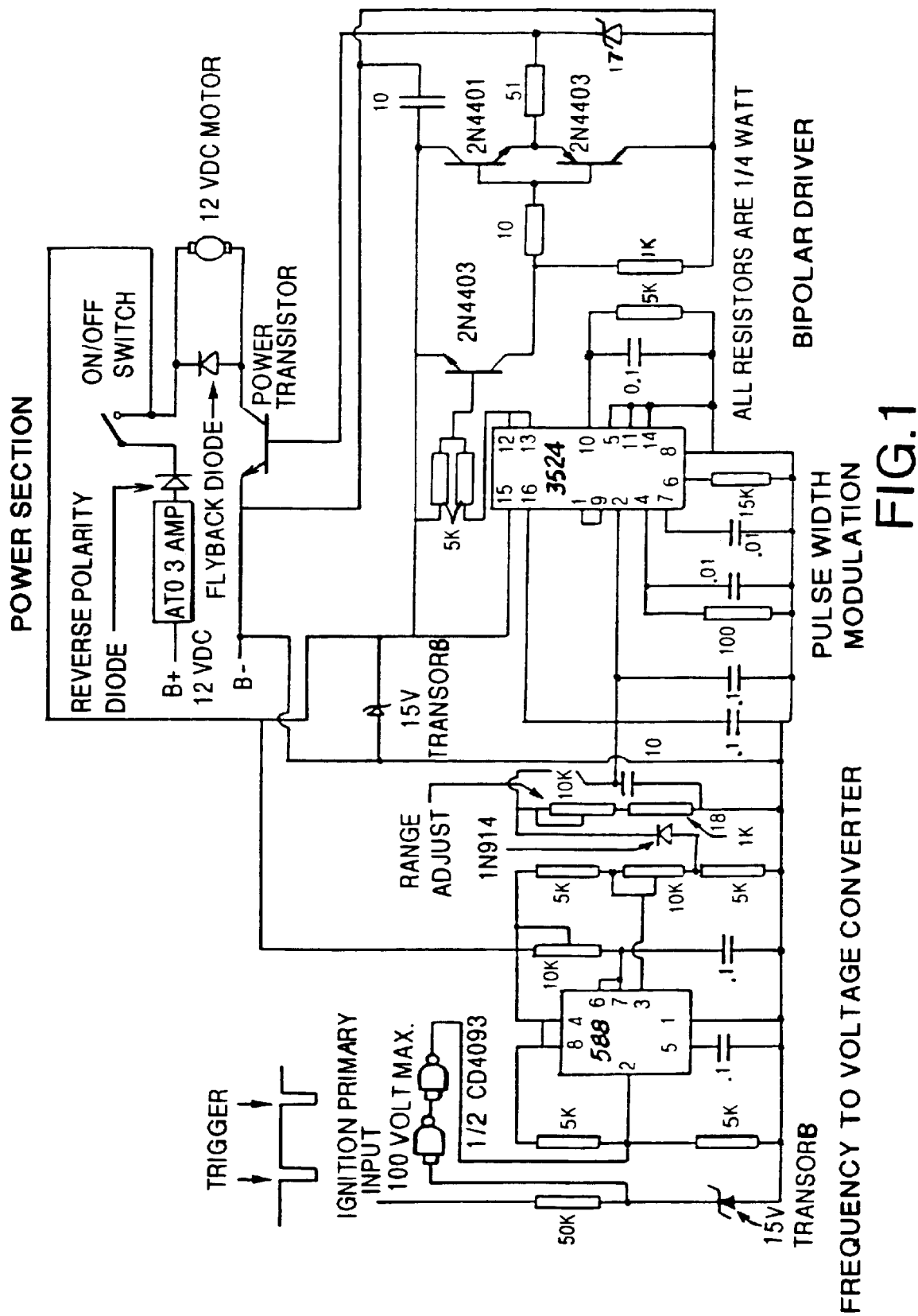
FIG. 1 is a schematic of a preferred embodiment of the circuit board that is in the controller box depicted in FIG. 2
Figure 2:
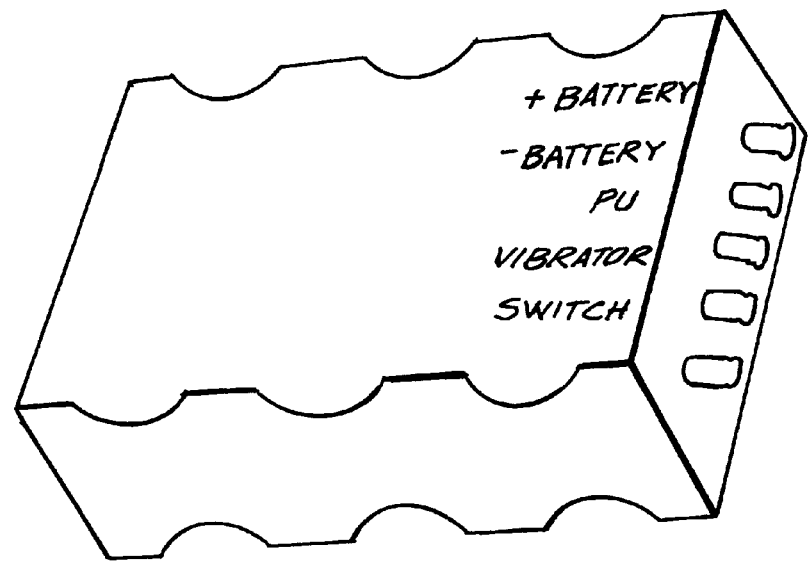
FIG. 2 is an exterior view of the controller box which houses the circuit board depicted in FIG. 1
Figure 5:
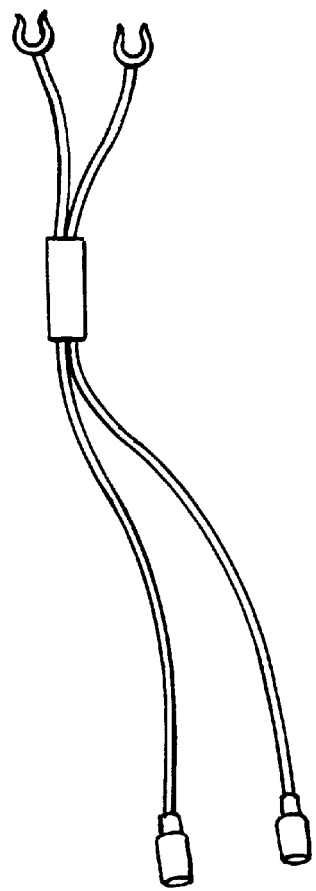
FIG. 5 is a depiction of the wires that connect the vehicle battery to the controller box depicted in FIG. 2.

The power means in the preferred embodiment is two wires, depicted in FIG. 5, running through an in-line fuse that are adapted to be attached to the battery terminals at one end and to the circuit board depicted in FIGS. 1 and 2 at the other end. In this embodiment, power is provided from the vehicle's battery to the vibrating motor through a control system that varies the frequency of vibration. However, the power means can be a separate battery pack (not depicted) either directly attached to the vibrating motor or connected through a control circuit. Additionally, the power means need not be directly attached to the vehicle's battery terminals, but can be attached anywhere in the vehicle's electrical system that receives constant power when the engine is running, such as the vehicle's fuse box.

Figure 6:
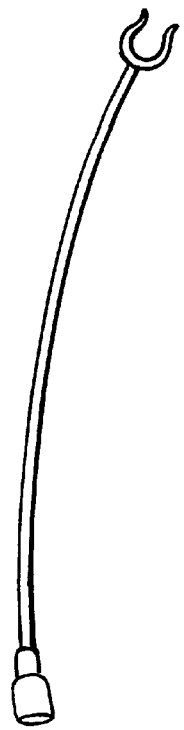
FIG. 6 is a depiction of the wire that connects the coil of the motorcycle's ignition system to the controller box (depicted in FIG. 2) to supply the synchronizing signal to the vibrator motor (depicted in FIG. 3).
Figure 6A:
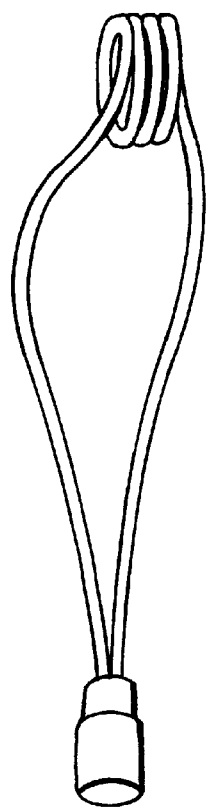
FIG. 6A is a depiction of an alternate embodiment of the wire that provides the synchronizing signal from the motorcycle's ignition system to the controller box (depicted in FIG. 2) to the vibrator motor (depicted in FIG. 3). In this embodiment the depicted ferromagnetic coil is installed around the spark-plug wire of the motorcycle.

The synchronizing means in the preferred embodiment is the circuit board depicted in FIGS. 1 and 2. In this embodiment a synchronizing signal is received from either a wire adapted to be attached to the vehicle's ignition coil (as depicted in FIG. 6) or a ferromagnetic coil adapted to be mounted around the vehicle's spark plug wire (as depicted in FIG. 6A). The synchronizing signal is then converted into an output to the vibrating means that varies the frequency and/or the intensity of the vibration in proportion to the synchronizing signal. An alternative embodiment of a synchronizing means (not depicted) would be to replace the circuit board with a simple slide switch that was adapted to be attached to the vehicle's throttle. This alternative embodiment would also adjust the frequency and/or intensity of the vibrating means in proportion to the throttle setting via the slide switch. A large number of commonly available multi-position analogue and digital switches, rheostats, dials, etc. could be used for this purpose. Additional alternative embodiments are possible, such as having the synchronizing means receive its synchronizing signal from other vehicle systems that have operating ranges that vary in proportion to the speed of rotation of the vehicle's engine. An example of this type of embodiment is providing the synchronizing signal through a wire adapted to be attached to a sensor in the vehicle's vacuum system.

FIG. 1 is a schematic of the preferred embodiment of the circuit board used in the invention to convert power input from the vehicle battery and the synchronizing signal from the vehicle ignition system into an output signal to a vibrator motor. This board is a Frequency To Voltage Converter Pulse Width Modulation Bipolar Driver. This 15 watt power pulse with modulator motor controller circuit is comprised of 4 basic sections. The first converts the voltage driving the primary side of the ignition coil to a variable voltage. This synchronizing input signal is received through either the coil pick-up wire depicted in FIG. 6 or the ferromagnetic coil depicted in FIG. 6A. This section is called the frequency to voltage converter. The second section converts the variable voltage to a pulse running with an approx. 8 khz. carrier and having a pulse width which is proportional to the input voltage. This section is called the pulse width modulator. The fourth section creates the signal required to drive a bipolar darling power transistor and controls the output to the motor. The circuit board will be housed in a hard plastic box (depicted in FIG. 2) and filled with potting. The potting will make the unit water proof. The circuit board receives the timing signal from the vehicle's ignition system and sends the synchronizing power signal to the vibrator motor. This unit is referred to as the controller box.

FIG. 2 is an exterior view of the controller box which is preferably a water-tight plastic box in which to house a circuit board. The circuit board is covered in potting filling the box to make it water proof. The box has 5 male plugs coming out of it for each of its components to plug into, all plugs being marked for easy plug installation. The controller box can be mounted anywhere on the vehicle because the other components wires are provided with extra length for this purpose and then cut to size during installation to crimp on the female fittings.

Figure 3:
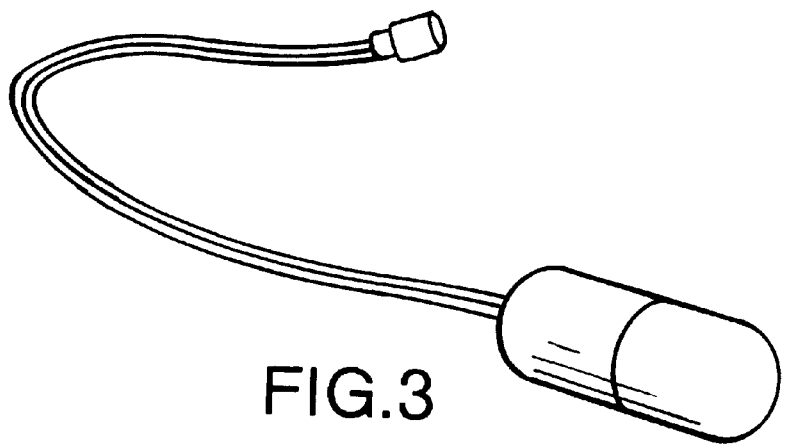
FIG. 3 is the vibrator motor which is installed inside the seat of the motorcycle.

FIG. 3 is one embodiment of the vibrator motor which is installed inside the seat of the motorcycle seat This embodiment of the vibrator motor is a 12 volt rotational spinning shaft with a off-center weight in-cased in plastic and water tight which will provide a centralized, pulsating feeling at the desired spot. At the end of each wire that leads to the controller box there is a female plug to be crimp on at the desired length. As described above, a wide variety of motors can be used. Additionally, the off-center weight can be replaced with an off-center massage ball to provide a rubbing sensation in addition to or in replacement of vibration. The depicted motor is designed to be placed inside the padding of a motorcycle seat. However, the motor can also be placed loosely on top of the seat, under the seat, taped or "velcro-ed" in place. The vibrator can be placed in or on the back-rest of the vehicle. The vibrator can be placed in a separate pouch which is then mounted to the vehicle in any of the described locations.

Figure 4:
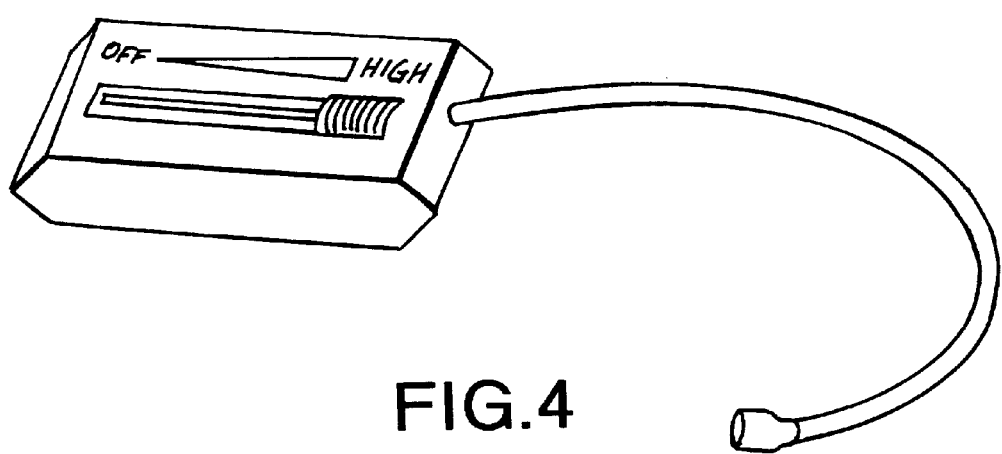
FIG. 4 is the multi-slide speed switch with off position.

FIG. 4 is a multi-speed slide switch with an off position. This switch may be included to control the strength of the vibration and also can shut the invention off so it will not drain the battery. In a preferred embodiment this switch is attached through the control box and allows setting of maximum vibration speed and/or intensity that varies with the synchronizing signal received by the control box. However, in an alternative embodiment, the slide switch can be moved by an input from the vehicle's throttle. The depicted preferred embodiment has two wires coming out of one end and running to the controller box which may be cut to the proper length and crimped on the supplied female plugs.

FIG. 5 is a depiction of the preferred embodiment battery wires that connect to the controller box to supply the power to the invention. The positive wire has a 3 amp ATO fuse installed in the in-line fuse holder which will have a red marking on it and the negative wire will be all black. At the end of each wire that connects to the controller box there is a female plug to be crimped on at the desired length.

FIG. 6 is a depiction of the preferred embodiment of a wire adapted to be connected to the ignition coil of the motorcycle and attaches to the controller box to transmit the synchronizing signal. This wire could be cut to the proper length and crimped on the supplied female plugs.

FIG. 6A is a depiction of an alternative embodiment of a ferromagnetic coil adapted to be installed around a sparkplug wire of the motorcycle and attached to the controller box to transmit the synchronizing signal.

Figure 7:
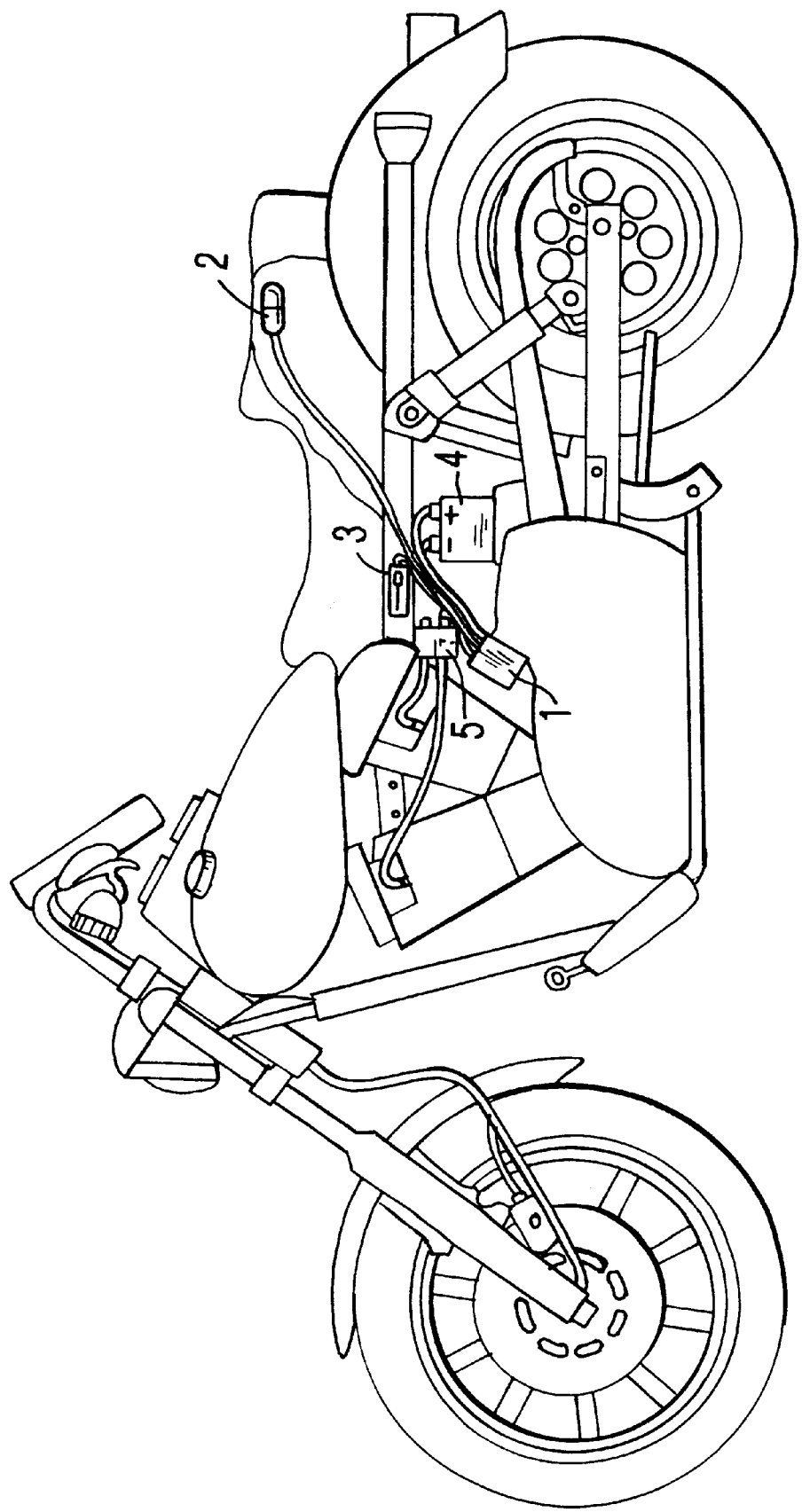
FIG. 7 is a side view of a motorcycle showing the positioning of the parts after the invention is installed.

FIG. 7 is a depicted of the preferred embodiment of the present invention as illustrated in a motorcycle. Controller box 1 of the unit contains the circuit board depicted in FIG. 1 and is centrally mounted in the motorcycle. The vibrator motor 2 (further depicted in FIG. 3) is installed inside the motorcycle seat by removing the seat and the cover and then cutting away a small piece of foam on the top and inserting the vibrator in the cut-out so the vibrator is flush and undetectable when re-covered. Also a slice in the foam from the vibrator to the bottom of the seat will be made to insert the wire runnig to the controller box. The multi-speed slide switch with off position 3 (further depicted in FIG. 4) is shown mounted at a desired location for convenient use. Wires 4 (further depicted in FIG. 5) connect the battery to the controller box to supply the power to the invention. The ignition coil of the motorcycle 5 is shown with the wire depicted in FIG. 6 attached from the coil to the controller box to transmit the synchronizing signal.

While there have been described what are presently believed to be preferred embodiments of the invention. It will be apparent to one skilled in the art that numerous changes can be made in the components, frequencies, structures and details set forth in the foregoing embodiments without departing from the invention as described herein and as defined in the appended claims.

What is claimed is:

1. A vibrator apparatus adapted to provide stimulation to a seat of a vehicle, said vehicle having at least one seat and said vehicle being powered by an internal combustion engine whose output is measurable in Revolutions Per Minute, said vibrator apparatus comprising:

(a) vibrating means adapted to be mounted on, under or within a seat of a vehicle;

(b) power means that is adapted to provide power to said vibrating means; and (c) synchronizing means adapted to automatically adjust the frequency of the vibration of said vibrating means in proportion to the Revolutions Per Minute of the internal combustion engine of the vehicle, in which the vibrator apparatus is adapted to be installed.

2. The vibrator apparatus of claim 1 wherein the internal combustion engine of the vehicle in which the vibrator apparatus is adapted to be installed has an ignition system and the synchronizing means is adapted to receive its input from said ignition system.

3. The vibrator apparatus of claim 1 wherein the seat of the vehicle in which the vibrator apparatus is adapted to be installed includes a back rest and the vibrating means is adapted to be mounted on, behind or within said back rest.

4. The vibrator apparatus of claim 1 wherein the internal combustion engine of the vehicle in which the vibrator apparatus is adapted to be installed has an associated vacuum system and the synchronizing means is adapted to receive its input from said vacuum system.

5. The vibrator apparatus of claim 1 wherein the internal combustion engine of the vehicle in which the vibrator apparatus is adapted to be installed has a starter battery and the power means is adapted to receive its input from said starter battery.

6. The vibrator apparatus of claim 1 wherein the internal combustion engine of the vehicle in which the vibrator apparatus is adapted to be installed has an ignition system and the power means is adapted to receive its power from said ignition system.

7. A vibrator apparatus adapted to provide stimulation to a seat of a vehicle, said vehicle having at least one seat and said vehicle being powered by an internal combustion engine that has an associated ignition system and whose output is measurable in Revolutions Per Minute, said vibrator apparatus comprising:
   (a) vibration means adapted to be mounted on, under or within a vehicle seat; and
   (b) a circuit control board which automatically adjusts the frequency of vibration of the vibration means in response to an input from the vehicle's ignition system.

8. The vibrator apparatus of claim 7 wherein the internal combustion engine of the vehicle in which the vibrator apparatus is adapted to be installed has a vacuum system and the circuit board receives its input from a wire adapted to be attached to a sensor in said vacuum system.

9. The vibrator apparatus of claim 7 wherein the vibration means is a solenoid switch vibrator.

10. The vibrator apparatus of claim 7 wherein the vibration means is a magnetic hammer vibrator.

11. The vibrator apparatus of claim 7 wherein the internal combustion engine of the vehicle, in which the vibrator apparatus is adapted to be installed, has a starter battery and the vibration means is adapted to receive its power from said starter battery.

12. The vibrator apparatus of claim 7 wherein the vibration means is adapted to receive its power from the vehicle's ignition system.

13. The vibrator apparatus of claim 7 wherein the vibration means receives its power from a battery pack.

14. The vibrator apparatus of claim 7 wherein the vibration means is attached to an off-center weight.

15. The vibrator apparatus of claim 7 wherein the vibration means is attached to an off-center massage ball.

16. The vibrator apparatus of claim 7 wherein the internal combustion engine of the vehicle in which the vibrator apparatus is adapted to be installed has a spark-plug wire and the circuit board receives its input from a ferromagnetic coil adapted to be installed around to said sparkplug wire.

17. The vibrator apparatus of claim 7 wherein the internal combustion engine of the vehicle in which the vibrator apparatus is adapted to be installed has an ignition coil and the circuit board receives its input from a wire adapted to be attached to said ignition coil.

* * * * *